US005826062A

United States Patent [19]

Fake, Jr. et al.

[11] Patent Number: 5,826,062
[45] Date of Patent: Oct. 20, 1998

[54] METHOD AND APPARATUS FOR CONVERTING AND DISPLAYING A MULTIMEDIA DOCUMENT AT A CLIENT

[75] Inventors: John Wesley Fake, Jr., Endicott; Stephen Scott Gruber, Vestal, both of N.Y.

[73] Assignee: International Business Machines Corporation, Armonk, N.Y.

[21] Appl. No.: 660,691

[22] Filed: May 30, 1996

[51] Int. Cl.$^6$ .................................................. G06F 13/00
[52] U.S. Cl. ................ 395/500; 395/200.18; 395/200.01
[58] Field of Search .............................. 395/500, 200.01, 395/200.18; 380/49; 379/67, 89; 707/500, 515, 523; 345/345

[56] References Cited

U.S. PATENT DOCUMENTS

| | | | |
|---|---|---|---|
| 4,972,462 | 11/1990 | Shibata | 379/89 |
| 5,333,266 | 7/1994 | Boaz et al. | 395/200 |
| 5,418,908 | 5/1995 | Keller et al. | 395/200 |
| 5,475,738 | 12/1995 | Penzias | 379/67 |
| 5,479,411 | 12/1995 | Klein | 370/110.1 |
| 5,568,540 | 10/1996 | Greco et al. | 379/89 |
| 5,621,658 | 4/1997 | Jackson et al. | 365/514 R |
| 5,625,675 | 4/1997 | Katsumaru et al. | 379/67 |
| 5,627,997 | 5/1997 | Pearson et al. | 395/500 |
| 5,630,060 | 5/1997 | Tang et al. | 395/200.01 |
| 5,647,002 | 7/1997 | Brunson | 380/49 |

OTHER PUBLICATIONS

"Tcl, Tk and Safe–Tcl", RELease 1.0, Feb. 18, 1994, v94, N2, p. 2.

"MIME gains vendor support; interoperable, robust E–mail debuts at EMA", by Doug van Kirk, InfoWorld, Apr. 18, 1994, v16, N16, p. 47.

"MIME: multimedia on the Internet", by Cavin Song, UNIX Review, Apr. 1995, v13, N4, p. 43.

"Using MIME to send more than text via the net", by Glyn Moody, Computer Weekly, Jul. 20, 1995, p. 37.

"MIME and Internet mail", by Tim Kientzle, Dr. Dobb's Journal, Sep. 1995, v20, N9, p. 54.

"MIME your mail: MIME protocol takes your messaging into the future", by David Aubrey, Computer Shopper, Jan. 1996, v16, N1, p. 610.

"A walk through the MIME fields: examining Multipurpose Internet Mail Extension encapsulation", by Thom Stark, LAN Times, Feb. 19, 1996, v13, N4, p. 100.

"MIME interoperability: sharing files via E–mail", by Jim Drews, Network Computing, Apr. 15, 1996, v7, N6, p. 96.

*Primary Examiner*—Kevin J. Teska
*Assistant Examiner*—Russell W. Frejd
*Attorney, Agent, or Firm*—Shelley M. Beckstrand

[57] ABSTRACT

A method and apparatus for converting and displaying at a client workstation a multimedia mail message. The mail message contains textual material and non-text embedded material. The method includes the steps of converting the mail message into text and non-text portions, storing the non-text portions in non-text files; and displaying a converted message. The converted message includes the text portion in clear text, and references to the non-text files.

8 Claims, 5 Drawing Sheets

WORK WITH MAIL

WORK WITH MAIL FOR ....: FAKEOV BOYD

TYPE OPTIONS, PRESS ENTER.
  2=REVISE A COPY    4=DELETE    5=VIEW    6=PRINT    8=WORK WITH DETAILS
  9=PRINT OPTIONS   10=FORWARD  11=REPLY  12=FILE REMOTE  13=FILE LOCAL
  14=AUTHORITY      15=FILL FORM

| OPT | STATUS | USER ID | ADDRESS | DESCRIPTION | DATE RECEIVED |
|---|---|---|---|---|---|
| | OPENED | JWFAKE | BOYD | THIS GUY HAS A REFERENCE..... | 02/10/96 |
| | NEW | JWFAKE | BOYD | TESTING WITH MULTIPLE IMAGES | 02/10/96 |
| | NEW | JWFAKE | BOYD | TESTING WITH MULTIPLE ADDRESS AND | 02/10/96 |
| | OPENED | JWFAKE | BOYD | TESTING WITH MULTIPLE IMAGES | 02/10/96 |
| | OPENED | JWFAKE | BOYD | 45~(DEEPSPAC.GIF) | 02/10/96 |
| | OPENED | JWFAKE | BOYD | 43~(COMB.GIF) | 02/10/96 |
| | OPENED | JWFAKE | BOYD | 41~(APPOLLO10.GIF) | 02/10/96 |
| | NEW | JWFAKE | BOYD | TESTING WITH MULTIPLE IMAGES | 02/10/96 |
| | | | | | MORE.... |

F3=EXIT    F5=REFRESH    F6=WORK WITH OUTGOING MAIL STATUS
F9=WORK WITH ACTION ITEMS  F10=DISPLAY NEW MAIL  F12=CANCEL  F24=MORE KEYS

FIG. 1

```
MAIL     P:12              VIEW INSTRUCTION       PG:1        LN:1
FROM: JWFAKE@AS011.ENDICOTT.IBM.COM
MESSAGE-ID:<9511221631.AA0042@JWFAKE@AS011.ENDICOTT.IBM.COM>
MIME-VERSION: 1.0
DATE: WED, 22 NOV 95 11:28:59 +0500
TO: FAKEOV@AS011.ENDICOTT.IBM.COM,
    "RICH THE HACKER HOCK" <HOCK@AS011.ENDICOTT.IBM.COM>
    SUBJECT: TESTING WITH MULTIPLE IMAGES
------------------------------------------------------------------------
THIS IS A TEST WITH MULTIPLE IMAGES
//----------------------------------------------------------------
// FROM THE DESK OF JOHN W. FAKE
// IN THE WORDS OF SCHULTZ THE GUARD FROM HOGAN'S HEROS

F3=EXIT          F7=WINDOW      F12=CANCEL       F16=FILE REMOTE
F4=FIND CHAR     F8=RESET       F13=EDIT OPTION  F17=FUNCTION
F5=GOTO          F10=FORWARD    F14=DELETE MAIL  F19=PRINT
F6=FIND          F11=REPLY      F15=FILE LOCAL   F21=NONDISPLAY KEYS
```

FIG. 2A

```
MAIL     P:12                  VIEW             PG:1         LN:16
// IN THE WORDS OF SHULTZ THE GUARD FROM HOGAN'S HEROS
// I SEE NUTTING, NUTTING!!!

------------------------------------------------------------------------
TYPE/SUBTYPE: IMAGE/GIF                                            }
DESCRIPTION: (APPOLLO10.GIF)                                       }—31
------------------------------------------------------------------------
TYPE/SUBTYPE: IMAGE/GIF
DESCRIPTION: (COMB.GIF)   }—33

F3=EXIT          F7=WINDOW      F12=CANCEL       F16=FILE REMOTE
F4=FIND CHAR     F8=RESET       F13=EDIT OPTION  F17=FUNCTION
F5=GOTO          F10=FORWARD    F14=DELETE MAIL  F19=PRINT
F6=FIND          F11=REPLY      F15=FILE LOCAL   F21=NONDISPLAY KEYS
```

FIG. 2B

```
MAIL    P:12            VIEW CARRIER RETURN        PG:1         LN:31
----------------------------------------------------------------
TYPE/SUBTYPE: IMAGE/GIF                                          } 35
DESCRIPTION: (DEEPSPAC.GIF)
----------------------------------------------------------------
AND FINALLY ALITTLE MORE TEXT.

F3=EXIT        F7=WINDOW      F12=CANCEL       F16=FILE REMOTE
  F4=FIND CHAR   F8=RESET       F13=EDIT OPTION  F17=FUNCTION
  F5=GOTO        F10=FORWARD    F14=DELETE MAIL  F19=PRINT
  F6=FIND        F11=REPLY      F15=FILE LOCAL   F21=NONDISPLAY KEYS
```

```
From:   @AS006.ENDICOTT.IBM.COM;popct08@as006.endicott.ibm.com   Wed Jan 10
11:33:18 1996
Return - Path: <@AS006.ENDICOTT.IBM.COM;popct08@as006.endicott.ibm.com>
Received: from as006.endicott.ibm.com by fakeps2.endicott.ibm.com (IBM OS/2 SENDMAIL
VERSION 1.3.2)/1.0)
        Id AA0329: Wed, 10 JAN 96 11:33:18 -0500
    Date: Wed, 10 Jan 96 11:33:18 -0500
Message-Id: <9601101633. AA0329@fakes2.endicott.ibm.com>
Received: from endmail9by as006.ENDICOTT.IBM.COM (IBM OS/400 SMTP V03R02M00) with TCP; Wed, 10 Jan 1996
10:23:42 +0000.
X-Sender: popct08@as006.endicott.ibm.com (Unverified)
X-Mailer: Windows Eudora Pro Version 2.1.2
Mime-Version: 1.0
Content-Type: multipart/mixed; boundary=" = = = = = = = = = = = = = = = = = = = = = =
_821301929= =_"
TO: fake@fakeps2.endicott.ibm.com
From: endmail9 <popct08@as006.endicott.ibm.com>
Subject: eudora attachments
X-Attachments: C:\EUDORA\ARGYLE.BMP:
-= = = = = = = = = = = = = = = = = = = = = = = = =_821301929 = =_
Content-Type: text/plain; charset= "us-ascii"
                                                     ⤴ 51
An example of using Eudora to send a text and bitmap.
-= = = = = = = = = = = = = = = = = = = = = = = = =_821301929 = =_
Content-Type: application/octet-stream; name="ARGYLE.BMP":
x-mac-type="424D5070"; x-mac-creator="4A565752"
Content-Transfer-Encoding: base64
Content-Disposition: attachment; filename= "ARGYLE.BMP"
```

FIG. 3A

```
Qk12AgAAAAAAHYAAAAoAAAAIIAAAAoAAAAAIIAAAACAAAAABAAQAAAAAAAAAAAAQAAAAAAAA
AAAAgAAAgAAAAICAAIAAAAICAAIAAgIAAAICAgADAwMAAAAD/AAD/AAAA/8A/wAAAP8A/wD/wAA
////AE1ERERERERERERE1E1ERERERsZERERERETURE1E1ERERNRERERE1ERE
REbGxsZERERE1ERERE1ERERsbGxsZERETURERERE1ERGxsbGxsZERNRERERE1EbGxsbGxsZE1E
RERERE1sbGxsbGxsbURERERERERG1sbGxsbGxtZERERERERERbG1sbGxsbG1sZERERERsbG1s
bGxsbWxsZERERERG1sbGxtbGxsbZ

METHOD AND APPARATUS FOR CONVERTING AND DISPLAYING A MULTIMEDIA DOCUMENT AT A CLIENT

FIELD OF THE INVENTION

The Multipurpose Internet Mail Extensions ("MIME") defined in Internet Engineering Task Force ("IETF") Request For Change 1521 ("RFC 1521") adds mail mechanisms that allow multimedia mail to be sent via the Internet. The current Simple Mail Transfer Protocol ("SMTP") mail server can not present these MIME notes in a manner that allows the textual material, as ASCII or EBCDIC textual material, and the non-textual embedded attachments, typically, multi-media, video, image, or audio binary files, to be viewed or used. Thus, there is provided, according to our invention, a method and apparatus for converting and displaying at a client workstation a multimedia mail message. The mail message contains ASCII or EBCDIC textual material and non-textual embedded material. The method includes the steps of converting the mail message into text and non-text portions, storing the non-text portions in suitable files; and displaying a converted message. The converted message includes the text portion in clear text, and references to the non-text files.

BACKGROUND OF THE INVENTION

The Multipurpose Internet Mail Extensions ("MIME") defined in Internet Engineering Task Force ("IETF") Request For Change 1521 ("RFC 1521") adds mail mechanisms that allow multimedia mail to be sent via the Internet. The current Simple Mail Transfer Protocol ("SMTP") mail server can not present these MIME notes in a manner that allows the textual material and the non-text embedded attachments to be viewed or used.

OBJECTS OF THE INVENTION

Thus, it is a primary object of the invention to present embedded non-text features in electronic mail, for example, multi-media files, in a way that enables the user to know that they are present.

It is a further object of the invention to encapsulate embedded non-text features in electronic mail, for example, multi-media files, in a way that enables them to be forwarded without loss.

SUMMARY OF THE INVENTION

These and other objects are attained by the method and apparatus of our invention. Thus, according to our invention there is provided a method and apparatus for converting and displaying at a client workstation a multimedia mail message. The mail message contains textual material, as ASCII or EBCDIC textual material and non-text embedded material. The method includes the steps of converting the mail message into text and non-text portions, storing the non-text portions in non-text files, as binary files; and displaying a converted message. The converted message includes the ASCII or EBCDIC text portion in clear text, and references to the non-text files.

Thus, according to our invention, the references to the non-text files in the converted message are inserted at positions corresponding to positions where non-text embedded material was encountered in the mail message.

According to a further embodiment of our invention, the references to the non-text files are placed in a mail box display with references to the converted message.

According to a still further embodiment of our invention there is provided the further step of forwarding the converted message and the non-text files to another client or application capable of displaying or executing the non-text files.

THE FIGURES

The invention may be more clearly understood by reference to the FIGURES appended hereto.

FIG. 1 shows a user mail box in an SMTP system, here IBM "OV400", with a converted MIME letter 11, including the converted text message 21, and references 41,43,45, to the three non-text xxx.gif files. These non-text xxx.gif files are image files, but they could also be audio files, motion video files, or the like.

FIGS. 2A, 2B, and 2C, which are a single message, show a converted MIME letter 11 with the text portions 21 and the references 31, 33, 35, to the non-text xxx.gif files 41, 43, 45.

FIG. 3 shows a MIME letter, including a text message 51, and also a non-text file 52 as garbled (that is, base 64, or non-readable) text in the SMTP mail server message.

DETAILED DESCRIPTION OF THE INVENTION

Figures 2, 2C:
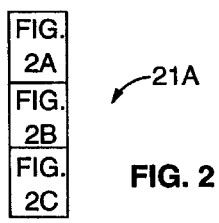

According to our invention there is provided, a method and apparatus for converting and displaying at a client workstation a multimedia mail message. The mail message contains textual material, such as ASCII textual or EBCDIC textual material, and non-text embedded material. The method includes the steps of converting the mail message into text 21 including references to non-text files 41, 43, 45 portions, storing the non-text portions in non-text files 41, 43, 45; and displaying a converted message. The converted message includes the text portion in clear text 21, and references 31, 33, 35 to the non-text files 41, 43, 45. This is shown in FIGS. 2A, 2B, and 2C.

Thus, according to our invention, the references 31, 33, 35, to the non-text files 41, 43, 45 in the converted message are inserted at positions corresponding to positions where non-text embedded material was encountered in the MIME mail message. This is illustrated in FIGS. 2A, 2B, and 2C.

According to a further embodiment of our invention, the references to (that is, the names of) the non-text files are placed in a mail box display, shown in FIG. 1, with references 21, 41, 43, 45, to the converted message.

According to a still further embodiment of our invention there is provided the further step of forwarding the converted message and the non-text files to another client or application capable of displaying or executing the non-text files.

Since many electronic mail systems are not Post Office Protocol ("POP") clients which can incorporate multi-media presentation software to handle the multi-media components of a MIME letter, it is necessary to break the MIME letter in textual material 21, typically ASCII or EBCDIC textual material, and non-text sub-components 41, 43, 45. These non-text sub-components 41, 43, 45, represent the multi-media images, audio files, video clips, etc., that can be embedded into MIME notes.

According to the invention described herein, all of the text portions of the MIME note are broken into one non-POP note, 21, and the embedded non-text portions of the MIME note are split into separate, non-text files, 41, 43, 45. This is accomplished by means of a parsing and attachment conversion program which converts text portions of a MIME message to EBCDIC representations and non-text portions from MIME-encoded representations to the Office Vision (OV) PC file object type.

In addition to the text portion of the MIME note, references, 31, 33, 35, to the non-text sub-components, 41, 43, 45, are also inserted into the textual note, 21, at the position where they were encountered in the original MIME note, as shown in FIGS. 2A, 2B, and 2C. This gives the recipient the capability of seeing the original MIME note's structure and correlating the non-text documents in his reader with where they were referenced in the MIME note.

These non-text documents can then be forwarded to other POP client users or stored in local folders. When the non-text documents are forwarded to other POP client users, they are converted into a MIME note with the appropriate "type" and "subtype" that a MIME client can interpert. Note that the original file name, if one is defined, along with the type and subtype of the non-text sub-component are preserved in the non-text file document during the incoming parse of a MIME note, and are used during the conversion from the non-text document to the MIME note.

FIGS. 3A and 3B show a MIME letter broken into a converted ASCII text message 51 and non-text files 52, as printed by a simple SMTP mail client.

FIG. 3A illustrates a MIME note including a header, a text message 51, and an image attachment 52 (which begins with the line after text message 51 and continues to FIG. 3B.) Applicants' invention relates to the processing of such MIME notes on the IBM AS/400 system, or the like. The MIME note of FIGS. 3A and 3B comes into the AS/400 system and is received by the AS/400 mail system framework (MSF). MSF exit points include, inter alia, exit points for attachment conversion, MIME parser, and local delivery.

In accordance with the invention, the MIME note of FIGS. 3A and 3B is processed as follows:

1. Receive the MIME note, which includes fields including originator, recipient(s), and attachments into the AS/400 mail system framework (MSF).
2. MSF determines if the recipient is an Office Vision (OV) recipient and, if so, calls the MIME parser and attachment conversion exit points.
3. The MIME parser parses the note into files which the attachment conversion exit point uses to create file system objects (FSOs), with (1) one FSO for all text, of type final form text (FFT) including references 31, 33, 35 (as shown in FIGS. 2A, 2B, 2C—while the references in FIGS. 2A–2C are not for the same example as set forth in the MIME note of FIG. 3, they illustrate this step anyway); and (2) an FSO for each non-text (image, audio, binary) file of PC file type (the names of these non-text FSOs are illustrated in FIG. 1 at 41, 43, 45.)
4. After the attachment conversion exit point creates the FSOs, the mail system framework (MSF) calls the local delivery exit point which passes the FSOs to the Office Vision (OV) mail client for presenting the user mail box of FIG. 1 to the user.
5. If the user enters (activates) option 5 VIEW on line 21 of his mail box display of FIG. 1, the "green screen" display of FIGS. 2A–2C is displayed to the user. The OV user cannot view non-text attachments 41, 43, 45 in the green screen display, but can forward them to POP users by entering (activating) option 10 FORWARD.

While the invention has been described with respect to certain preferred embodiments and exemplifications, it is not intended to limit the scope of the invention thereby, but solely by the claims appended hereto.

We claim:

1. A method for operating a client workstation to convert and display at said client workstation a multimedia mail message, said mail message containing textual material and non-text embedded material, said method comprising the steps of:
   a. converting said mail message into a text portion and at least one non-text;
   b. storing each said non-text portion in a non-text file;
   c. presenting at a user mail box references to said mail message and to said non-text file; and
   d. responsive to a user request to view said mail message, displaying a converted message including
      (i) said text portion in clear text, and
      (ii) references to said non-text files;
   whereby said at least one non-text portion is removed from the display of said message thereby enhancing readability of said converted message.

2. The method of claim 1 comprising placing said references to said non-text files in said converted message at positions corresponding to positions where non-text embedded material was encountered in said mail message.

3. The method of claim 1 comprising placing said references to said non-text files in a mail box display with references to said converted message.

4. The method of claim 1 comprising the further step of forwarding said converted message and said non-text files to another client or application capable of displaying or executing said non-text files.

5. A client workstation apparatus for converting and displaying at said client workstation a multimedia mail message, said mail message containing textual material and non-text embedded material, said apparatus comprising means for:
   a. converting said mail message into ASCII text and non-text portions;
   b. storing said non-text portions in non-text files;
   c. presenting at a user mail box references to said text portion and to said non-text file; and
   d. displaying a converted message including
      (i) said text portion in clear text, and
      (ii) references to said non-text files.

6. The apparatus of claim 5 comprising means for placing said references to said non-text files in said converted message at positions corresponding to positions where non-text embedded material was encountered in said mail message.

7. The apparatus of claim 5 comprising means for placing said references to said non-text files in a mail box display with references to said converted message.

8. The apparatus of claim 5 comprising means for forwarding said converted message and said non-text files to another client or application capable of displaying or executing said non-text files.

* * * * *